Figure 1:
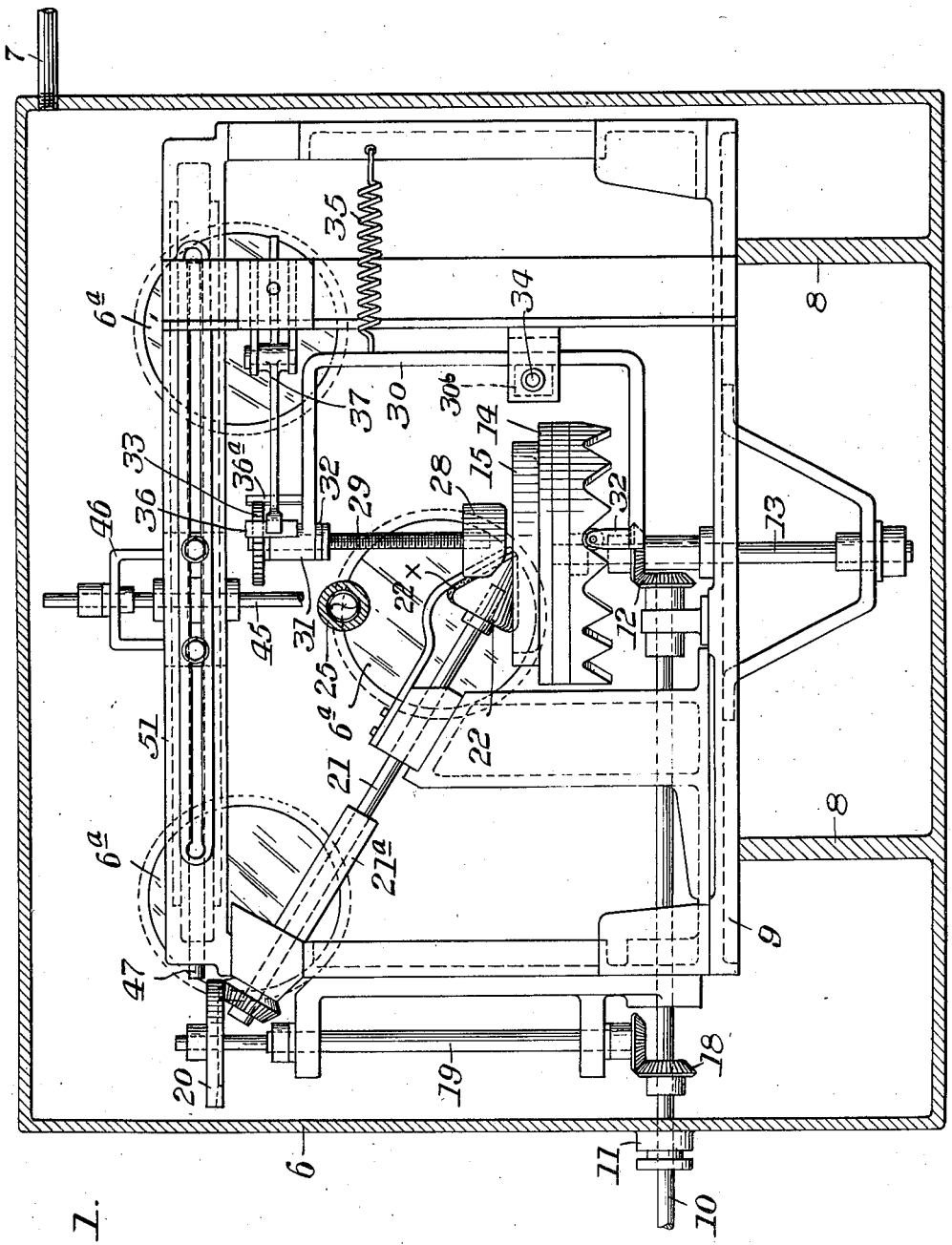

June 24, 1930. F. W. PRESTON 1,765,804
METHOD OF AND APPARATUS FOR MAKING CLAY POTS
Filed May 5, 1927 4 Sheets-Sheet 2
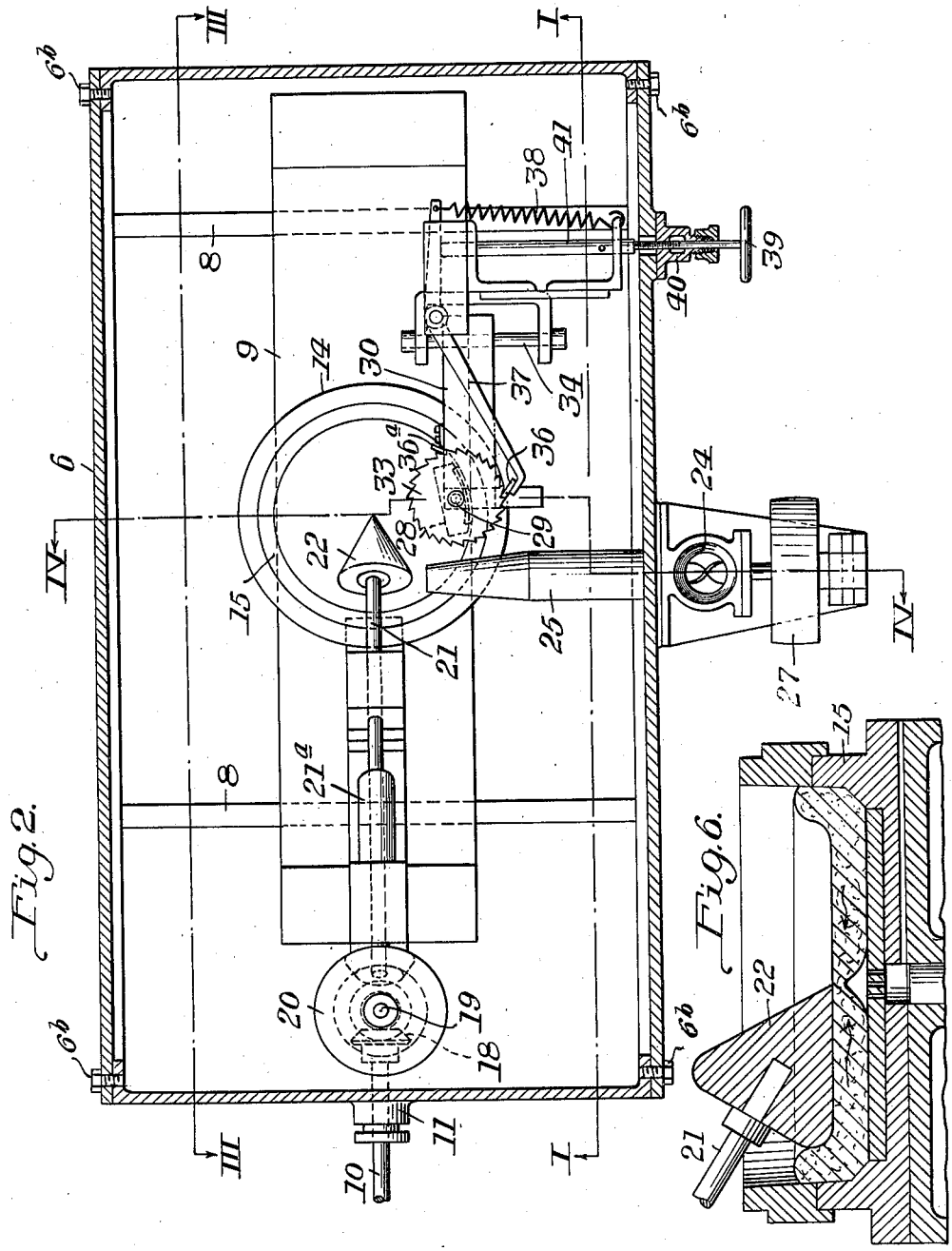
INVENTOR
Frank W. Preston
By Archworth Martin,
Attorney.

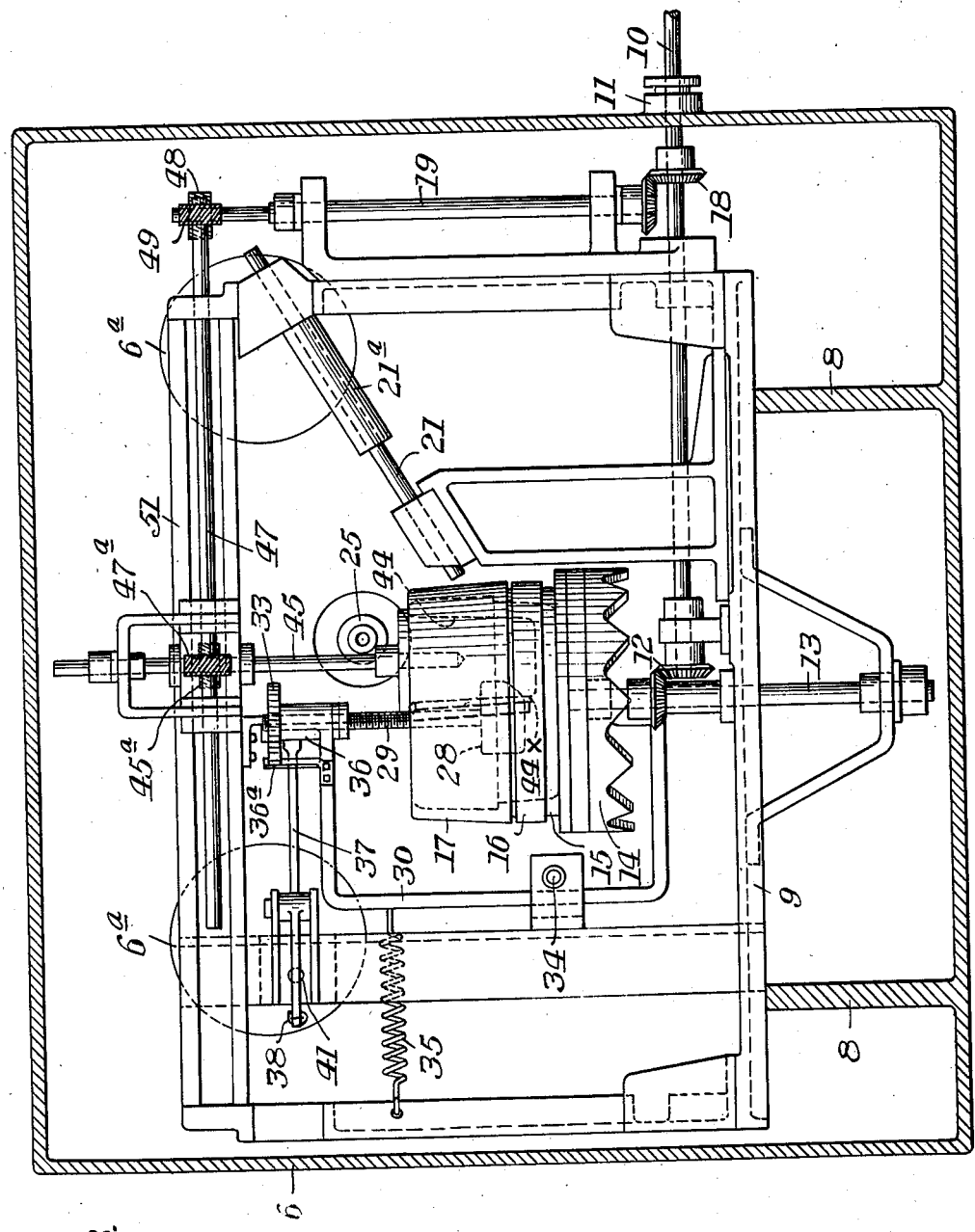

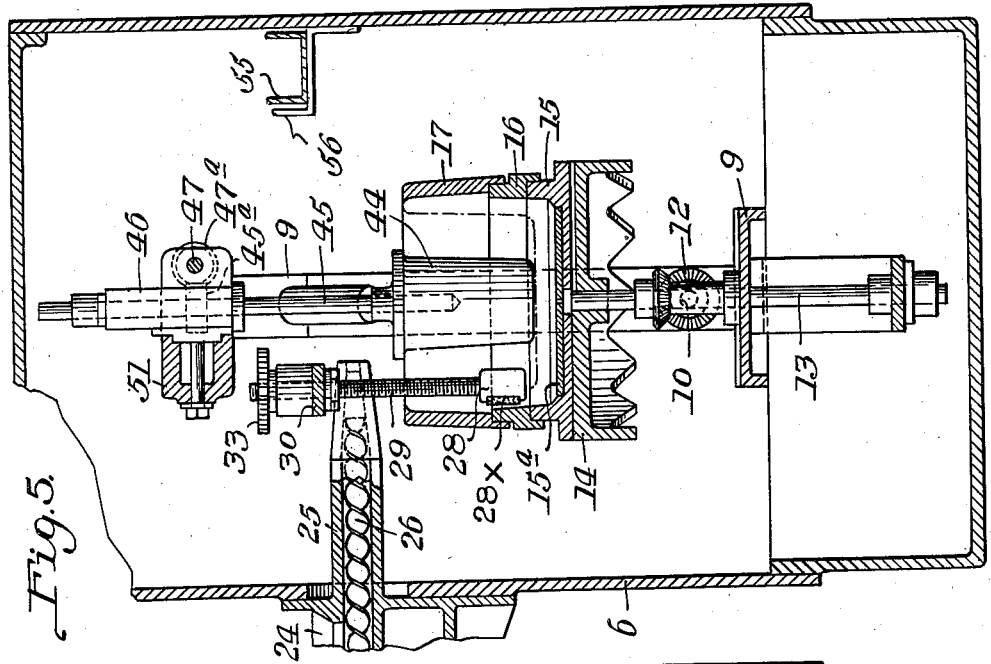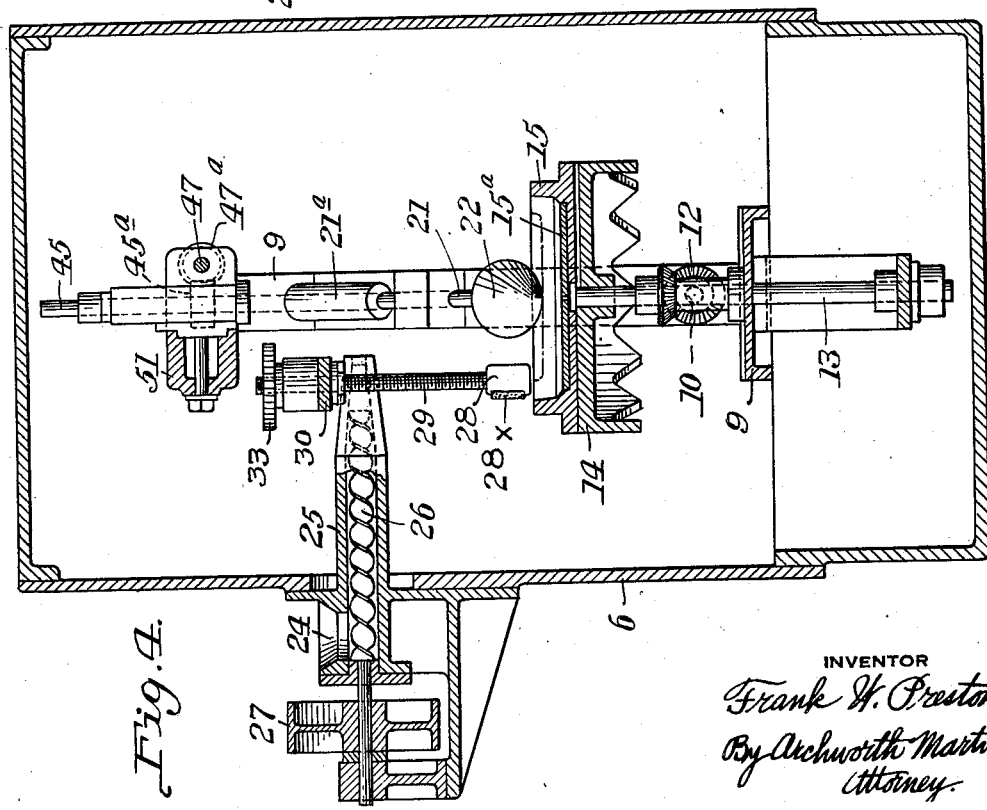

Patented June 24, 1930

1,765,804

UNITED STATES PATENT OFFICE

FRANK W. PRESTON, OF BUTLER, PENNSYLVANIA

METHOD OF AND APPARATUS FOR MAKING CLAY POTS

Application filed May 5, 1927. Serial No. 189,094.

My invention relates more particularly to the manufacture of clay articles such as pots commonly employed as containers in which glass batches are melted, but it will be understood that the invention is applicable in connection with the manufacture of various other forms of articles from plastic materials of various kinds.

In the manufacture of refractory bodies for use against molten glass, it is desirable to have them of the greatest possible density, in order that they will resist the disintegrating action of molten glass. Disintegration of the refractory bodies, not only shortens the life thereof, but results in the presence of impurities such as "stone" in the molten glass.

Heretofore, glass pots have commonly been formed by building them up in courses or "spells" by hand, it being necessary to allow considerable time to elapse between the placing of the various courses entering into a pot, in order to permit the clay comprising one course to stiffen before applying the next course. Care must be exercised to have the masses of plastic clay entering into the construction of the pot as compact and free from entrapped air as possible, in order to secure the desired density of structure. This hand operation requires considerable time, in addition to which difficulty is experienced in securing the proper degree of compactness.

Attempts have been made to form pots by placing a mass of clay in a mold and bringing a plunger into engagement with the clay to force it against the sides of the mold but, here again, it has been impossible to secure sufficient compactness of structure.

Still another method involves the pouring of a clay casting slip into the molds, and is commonly designated as "slip casting." This method, of course, requires that the clay be more fluid than in the case of the other methods referred to, with the result that there is a tendency toward excessive shrinkage of the clay body, and the formation of voids through elimination of the moisture in drying the batch.

My invention has for one of its objects the provision of a method and apparatus whereby the objectionable features of the older methods are eliminated, and to simplify and improve generally the art of forming plastic clay bodies and the improvement of the quality thereof.

Another object of my invention is to provide a means and method whereby clay bodies may be rolled, formed, or built up by mechanically operable shaping devices.

Another object of my invention is to provide means for building and shaping a clay body within a vacuum.

A further object of my invention is to provide an improved means for eliminating the moisture and air from the clay entering into the structure of the body.

Still another object of my invention is to provide clay working members having working surfaces of such character that plastic clay will not adhere thereto.

One manner in which my invention may be practised is shown in the accompanying drawing, wherein Figure 1 is a longitudinal sectional view, taken on the line I—I of Fig. 2; Fig. 2 is a sectional plan view of the apparatus; Fig. 3 is a view taken on the line III—III of Fig. 2; Fig. 4 is a view taken on the line IV—IV of Fig. 2; Fig. 5 is a view similar to Fig 4, but showing the conical roller removed and the roller for forming the side of the pot in operative position, and Fig. 6 shows the manner in which air is released from beneath the clay of which the bottom of the pot is formed.

The apparatus is mainly contained within a casing 6 within which a vacuum may be maintained through a pipe 7 that is connected to a suitable source of vacuum. The casing 6 is provided with ribs 8 that support a framework 9 upon which the moving parts of the apparatus are mounted. The sides of the casing 6 are removably secured in place as by screws 6ᵇ (Fig. 2) or suitable clamps, to permit access to the interior of the casing.

A shaft 10 driven from any suitable source of power (not shown) extends through a stuffing box 11 in an end wall of the casing 6 and is supported in suitable bearings in the framework 9. A bevel pinion 12 on the inner end of the shaft 10 meshes with a bevel pinion that is secured to a vertical shaft 13, which is journalled in the framework 9. The upper end of the shaft 13 carries a mold table 14 that is rotatable with the shaft. The table 14 serves as a support for mold sections 15, 16 and 17 that are assembled in a manner to be hereinafter described.

A beveled pinion 18 is secured to the shaft 10 and meshes with a gear wheel at the lower end of the vertical shaft 19. The upper end of the shaft 19 has a bevel pinion 20 detachably secured thereto, which meshes with a gear wheel on the upper end of an inclined shaft 21. The lower end of the shaft 21 carries a conical roller 22 whose lowermost generating line is disposed parallel to the plane of the bottom mold section 15 to spread the clay upon the bottom of the mold, so as to form the bottom wall of the pot. A radius is formed between the base of the conical roller 22 and its side that will give the proper contour or radius to the inner wall of the pot at that point where the bottom and side walls meet.

Clay, which has been previously pugged, is fed to a hopper 24 (see Fig. 4) and through a conduit 25 by means of a screw 26 which is driven by a pulley 27. At the inner end of the conduit 25, the clay will break off and fall into the mold. There is usually such volume of clay within the conduit 25 that the vacuum within the casing 6 will not be broken.

A tamping member 28 is provided for pounding and kneading the clay to permit it to be rolled into a compact mass by the rollers.

The tamper 28 is secured to the lower end of a screw shaft 29 (see Fig. 1). The shaft 29 is supported upon one leg of a yoke-like lever 30. The upper leg of this lever has a bearing 31 formed thereon which contains a threaded sleeve 32 to which a ratchet wheel 33 is connected and which has screw-threaded engagement with the shaft 29. The lower leg of the lever 30 is provided with an upstanding lug 30ª that carries an anti-friction roller which engages with cam surfaces or serrations in the edge of the table 14. The lever 30 has a block-like extension 30ᵇ which is pivotally connected at 34 to the framework 9. A tension spring 35 normally holds the extension 32 of the lever in engagement with the serrations on the edge of the table, so that as the table 14 is driven, the lever 30 will be oscillated about its pivot 34 to raise and lower the tamping member 28.

In order to elevate the tamper 28 as the thickness of the clay body increases, I provide a pawl 36 that is carried upon one arm of a crank 37. The crank 37 is pivoted in the framework as shown more clearly in Figs. 1 and 2 and has a rear extension connected to a spring 38 which tends to hold the pawl 36 in engagement with the ratchet wheel 33. The pawl 36 is elongated, so that it will not be thrown out of engagement with the ratchet 33 during oscillation of the lever 30. As the lever 30 is oscillated by movement of the table 14, the ratchet 33 will be given reciprocatory movement relative to the pawl 36 so that upon the return stroke, the ratchet will be rotated slightly, turning the threaded sleeve 32 and elevating the tamper 28 slightly. A dog 36ª prevents backward movement of the ratchet wheel 28.

During building up of the bottom of a clay pot within the mold sections 15 and 16, it will for a time be desired to have the tamper 28 reciprocate in a fixed path, without being elevated relative to the lever 30. In order to render the pawl 36 inactive, I provide a handwheel 39 that has a stem which has threaded engagement with a block 40 and abuts against a slidably mounted bar 41, so that said bar may be forced inward to rock the crank arm 37 against the tension of the spring 38, thus moving the pawl 36 away from the ratchet wheel.

At the beginning of the formation of a pot within the molds, the tamper 28 operates upon the clay as above indicated and the tapered roller 22 shapes the same to the contour of the bottom and side walls of the mold section 15, as above indicated, either with or without the mold section 16 in position. After that portion of the pot lying within the mold section 15 has been completed, the shaft section 21 that carries the tapered roller 22 is slid backward into the sleeve 21ª with which it has telescopic engagement and which forms a portion of the driving connection between the bevel gear wheel 20 and the roller 22. This movement withdraws the roller 22 out of the mold, and the roller can be removed from the shaft 21 if a greater clearance is required.

The mold sections 16 and 17 may then be placed in position. All of the mold sections, 15, 16 and 17, are preferably split on vertical lines, to facilitate the placing thereof in position on the table 14, and clamped or held together by bands or the like in any well known manner. A roller 44 for forming the side wall of the pot is then placed in position with its vertical shaft 45 rotatably supported upon a bracket 46 that constitutes part of the framework 9 of the apparatus. The shaft 45 has helical gear connection with a horizontal shaft 47, through 47ª and 45ª, as shown more clearly in Fig. 3. The shaft 47 is driven through a helical gear connection comprising gear wheels 48 and 49, from the shaft 19, the gear member 48 being substituted for the bevel pinion 20 of Fig. 1, and meshing with the gear member 49 that is secured to the shaft 47.

Rotation of the shaft 10 drives the table 14 and also rotates the wall-rolling roller 44. Clay is simultaneously introduced through the conduit 25 as above explained, and the lumps thereof are operated upon by the tamper 28 which is reciprocated in the manner heretofore described and is rolled by the roller 44 to form the sides of the pot. During this operation, the pawl and ratchet mechanism 36—33 may be operated continuously to slowly raise the tamper 28, if the clay is supplied rapidly enough and is being properly worked.

Windows 6$^a$ (Fig. 1) are provided in the walls of the casing 6 so that the operator can note progress in the formation of the pot, without opening the tank and breaking the air seal.

I prefer to form the side wall of the pot of slightly greater thickness than desired for the finished article, until such wall is within an inch or two of its upper edge, and then remove the tamper. The bracket 46 which carries the shaft 45 is then slid slightly upon a slideway 51 which constitutes part of the frame 9, to reduce the distance between the roller 44 and the adjacent wall of the mold, to effect further consolidation and smoothing of the pot while under the action of the roller alone, with the tamper 28 inactive. In order to permit this movement without breaking the driving connection, the gear wheel 47$^a$ is slidably mounted upon its shaft.

It is desirable that the rollers 22 and 44 be given rolling movement upon the clay, because if they were permitted to remain stationary, and only the mold rotated, there would be too much tearing and breaking up of the clay. For this reason, the gear reduction which drives the rollers will have such ratio with respect to the bevel gear wheel 12 which drives the table that there will be little or no sliding of the rollers upon the clay as they press the same against the walls of the mold. I further prefer to provide felt pads or wipers for the rollers 22 and 44 and the tamper 28, as indicated at 22$^x$, 28$^x$ and 44$^x$ in Figs. 1, 3 and 4, in connection with the rollers 22 and 44 and the tamper 28. The pads are supported upon suitably fixed brackets and are periodically impregnated with oil, so that they will wipe the rolls and the tamper to keep them free of clay and lubricate the clay-contacting surfaces thereof to reduce the tendency of the clay to adhere thereto.

At the completion of the formation of a pot within the molds as indicated in Fig. 5, the mold sections 17 and 16 are disassembled and the pot ejected from the mold section 15 by means of a false bottom 15$^a$ that is loosely supported in the bottom of such section, the mold section being placed upon a member that will engage the mid portion of such false bottom to eject the same. The false bottom is shown as provided with one or more perforations to permit escape of air from beneath the clay which goes to make up the bottom of the pot. As indicated in Fig. 6, the clay will at first be compacted more tightly beneath base portion of the roller 22 and will be crowded toward the center of the pot bottom, with the result that there will be a tendency for air to become entrapped at such point. This air will be forced out through the perforations in the mold bottom as the pot bottom is gradually built up and compacted.

If desired, the pipe 7 can be utilized as a means for injecting heated or dry air into the casing 6 in order to hasten drying of the clay and permit more rapid building up of the pot without danger of distortion of the clay body by reason of its softness. Also, I contemplate the employment of drying agents, within the casing, such as sulphuric acid or calcium chloride, either in conjunction with the application of vacuum or without the use of vacuum. Suitable containers for the drying agents, such as trays 55 (Fig. 5) may be supported upon shelves 56 within the casing or otherwise placed therein.

It will be understood that the following claims are not limited to the formation of a pot or other body of plastic material by inside rolling, as it will be apparent that the rolling operation could be formed by rolls disposed externally of a mold, or by rolls applied both to the internal and external walls of the body to be formed.

I claim as my invention:—

1. The method of making pots, which comprises depositing plastic material in proximity to a mold side, rolling the said material against the mold side, and simultaneously kneading the material by intermittently applied force.

2. The method which comprises simultaneously tamping and rolling plastic material against a mold surface to a thickness in excess of that desired for the finished article and thereafter rolling the surface of the material to reduce it to the desired thickness.

3. The method which comprises kneading and shaping masses of plastic material to form an article within a vacuum.

4. Apparatus for forming articles of plastic material comprising a mold, a roller, means for imparting relative movement to said roller and mold to compress the material against the mold, and means for simultaneously kneading the material.

5. Apparatus for forming bodies of plastic material which comprises a mold, means for rolling the material to shape within the mold and means for continuously distorting the material during rolling.

6. Apparatus for forming bodies of plastic material, comprising a mold, a roller arranged so that its peripheral portion will compact the material against the bottom of the mold, a second roller arranged to compact the material against the sides of the mold, and means for imparting relative movement to said rollers and mold to effect spreading and compressing of the material against the mold.

7. Apparatus for forming bodies of plastic material, comprising a mold bottom section, a roller movable into operative position to compress material against said bottom section, an upper mold section, and a roller disposed on a vertical axis and positioned to compress the material against the said upper section, the first-named roller being removable from the mold.

8. Apparatus for forming bodies of plastic material, comprising a mold, a roller arranged so that its peripheral portion will compact material against the bottom of a mold, a second roller arranged to compact the material against the sides of the mold, and means for imparting relative movement to said rollers and mold to effect spreading and compressing of the material against the mold, and a distorting device for operating upon the material during the rolling operation.

9. Apparatus for forming bodies of plastic material, comprising a vacuum chamber, a mold, a tamping device for operating upon material within the mold, and means permitting manipulation of said tamping device from a point exteriorly of the chamber, without permitting the entry of air into the chamber.

10. Apparatus for forming bodies of plastic material, comprising a vacuum chamber, a mold, material-working devices for operating upon the material within the mold, and means for supplying said material from a point exteriorly of the casing and for operating said devices without breaking the vacuum within the mold.

11. The method which comprises kneading plastic material within a container, in the presence of a drying agent.

12. The method of forming bodies of plastic material, which comprises shaping a plastic mass to substantially the desired form, distorting said mass by intermittently applied force, and thereafter reforming the same.

13. The method of making bodies of plastic material, which consists in employing a member to continuously form the body to approximately the desired shape and simultaneously employing another member to distort the body slightly from its desired shape, through intermittently applied force the combined action of the two members resulting in a continual shaping and distortion of the body, so that the plastic material becomes very thoroughly compacted.

14. The method which comprises forming pot bottoms or the like, of plastic material, by working the material upon a supporting surface that is centrally perforated to permit escape of air from behind the material, and compressing the material on said surface, by operating first upon that portion of the material nearest the edges of said surface and completing the compressing operation at the central portion of said surface.

15. Means for forming an article of plastic material upon a supporting surface that has an opening at one point to permit escape of air, and means for compacting the material upon said surface first at points remote from said opening, and thereafter at points adjacent thereto.

16. Apparatus for forming pots, which comprises a conical roller for compressing plastic material against the bottom of a mold, and means for revolving said roller about an axis that is inclined with respect to the plane of said mold bottom.

17. The method of forming vessels of plastic material, which comprises first shaping the bottom of the vessel to substantially final form and thereafter adding material by degrees and simultaneously shaping it to form the vertical walls of the vessel.

18. The method of forming vessels of plastic material, which comprises forming the bottom of a vessel by consolidating the material to substantially its final form, and thereafter consolidating material upon said bottom and against the side walls of a mold.

19. The method of forming vessels of plastic material, which comprises forming the bottom of a vessel by consolidating material within a bottom mold to substantially its final form, placing a side-wall mold above the bottom mold, and thereafter consolidating material against said side mold and upon the material forming the bottom of the vessel.

20. The method which comprises simultaneously tamping and rolling plastic material against a mold surface to a thickness in excess of that desired for the finished article and thereafter further compacting and smoothing the material to reduce it to the desired thickness.

21. The method which comprises continuously rolling plastic material against a molding surface and simultaneously distorting it.

22. Apparatus for forming bodies of plastic material comprising means for continuously rolling the body to shape, and means for simultaneously distorting the body of shaped material, the said shaping means being located at a point remote from the rolling means.

23. Apparatus for shaping plastic material comprising a revolvable deck, means at one portion of the deck for shaping plastic material, and means at another part of the deck for distorting the material so shaped.

24. Apparatus for shaping plastic material comprising a revolvable deck, a mold carried thereby, means for depositing small pieces of plastic material in proximity to the vertical wall of the mold, means for rolling the clay continuously against said wall, and means removed from said rolling means for distorting the clay during the rolling operation.

In testimony whereof I, the said FRANK W. PRESTON, have hereunto set my hand.

FRANK W. PRESTON.